United States Patent [19]

Cleavenger

[11] 3,955,021
[45] May 4, 1976

[54] METER BOX WINDOW COVER

[75] Inventor: Thomas H. Cleavenger, Chicago, Ill.

[73] Assignee: Cleavenger Associates, Inc., Chicago, Ill.

[22] Filed: Mar. 6, 1974

[21] Appl. No.: 448,658

[52] U.S. Cl. .................................. 428/81; 73/431; 324/156; 428/132; 428/133; 428/192
[51] Int. Cl.² .................. B32B 1/04; B32B 3/02
[58] Field of Search ............... 73/430, 431; 156/92, 156/293; 161/18, 43, 44, 111, 89; 174/66; 264/273, 274; 324/156; 428/81, 132, 133, 192

[56] References Cited
UNITED STATES PATENTS

| | | | |
|---|---|---|---|
| 2,458,152 | 1/1949 | Eakins | 156/92 X |
| 2,511,168 | 6/1950 | Martin et al. | 156/293 X |
| 2,579,170 | 12/1951 | Bell | 324/156 |
| 2,581,734 | 1/1952 | Triplett | 324/156 |
| 3,030,255 | 4/1962 | Winston | 264/273 X |
| 3,074,832 | 1/1963 | Graff | 264/274 X |
| 3,093,526 | 6/1963 | Price et al. | 264/249 X |
| 3,209,599 | 10/1965 | Harland et al. | 73/431 |
| 3,308,225 | 3/1967 | Wells | 264/273 X |
| 3,699,915 | 10/1972 | Greene | 73/431 X |
| 3,717,032 | 2/1973 | Alinari | 73/431 X |

FOREIGN PATENTS OR APPLICATIONS 659,191   10/1951   United Kingdom .................. 428/133

Primary Examiner—William J. Van Balen
Assistant Examiner—Henry F. Epstein
Attorney, Agent, or Firm—Edward C. Threedy

[57] ABSTRACT

A metal case plastic-face meter box window cover having a metallic frame providing an exposed peripheral edge which is capable of being welded or soldered onto the meter box and having a transparent face of plastic material molded upon a peripheral flange of the metal case, with such peripheral flange forming a thin web of metal capable of conforming to the change of the plastic during its curing stage so as to prevent loss of adhesion therebetween.

2 Claims, 8 Drawing Figures

METER BOX WINDOW COVER

SUMMARY OF THE INVENTION

A meter box window cover comprising a pre-shaped metal frame providing a peripheral edge which is exposed so that the same may be readily welded or soldered onto the face of the meter box, which form of connection is preferred over the bolting or riveting of the cover onto the box, as the former provides a better protective seal therebetween.

The metal frame is so formed as to provide a window area which is defined by an internal peripheral flange. The flange may be provided with a plurality of slots so as to form thin webs of material throughout the flange area, or punched to provide holes to receive deformable mounting studs carried by the plastic window.

A transparent face of a thermoplastic composition is molded upon the internal flange, with the composition flowing freely through the slots and around the thin webs of material of the frame. Thus, during the curing stage of the composition the thin webs of material may distort and conform to the shrinking plastic without rupturing its adhesion thereto. In the event the composition provides the mounting studs, then these studs are heat-riveted onto the flange.

GENERAL DESCRIPTION

The invention will be best understood by reference to the accompanying drawings showing the preferred form of embodiment of the invention, and in which.

Figure 1:
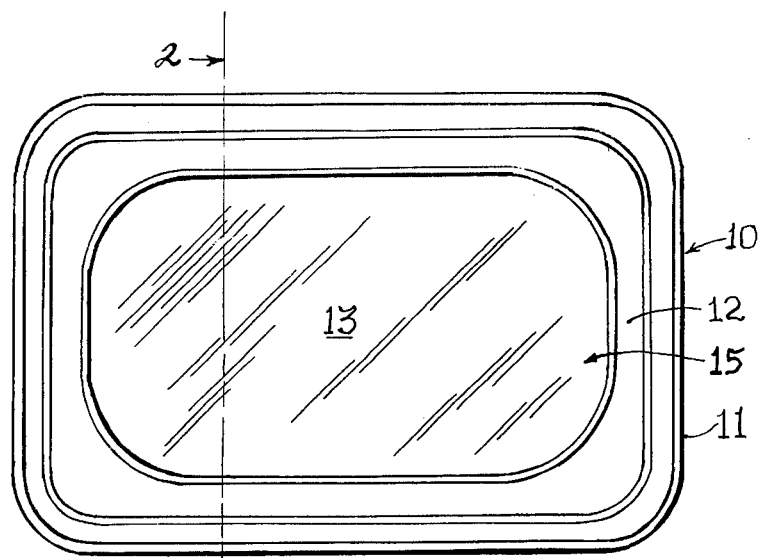
FIG. 1 is a front plan view of the improved meter box window cover.

This invention relates to a meter box window cover that may be readily replaced upon present metal meter boxes which heretofore have been provided with a glass window cover over the dial mechanisms of the meter. Through use and normal deterioration, the glass cover either becomes cracked, broken or loses its transparency by becoming materially fogged or frosted. Replacement meter covers have been formed of plastic materials which then require a sealing operation around the peripheral edge, which is expensive and impractical. In the past, such replacement window covers have been either bolted or riveted onto the meter box, which action also requires a seal which is subject to deterioration.

The present invention relates to a meter box cover which includes a pre-formed metallic frame 10. The frame provides a peripheral edge 11 as well as a peripheral flange 12 which is disposed angularly with respect to the peripheral edge portion 11 of the frame and which defines a generally rectangularly shaped window area 13.

Figure 2:
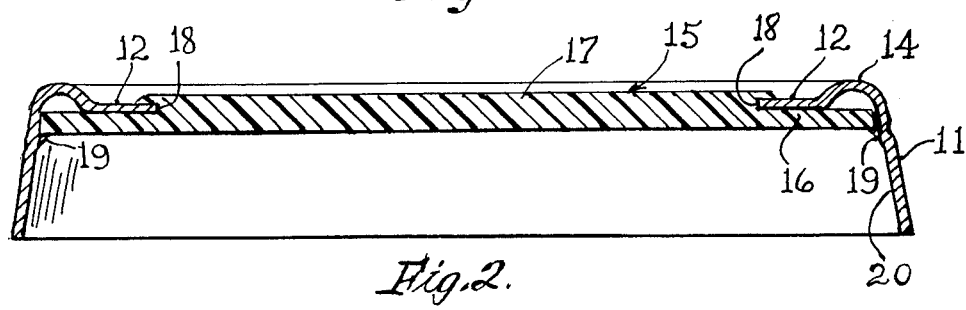
FIG. 2 is a detailed sectional view taken on line 2—2 of FIG. 1.

As shown more clearly in FIG. 2, the meter box window cover provides a raised peripheral bead 14 forming the junction between the edge 11 and the flange 12. The peripheral bead 14 adds strength to the cover and defines generally the window area of the same. A thermoplastic lens 15 of generally rectangular shape is provided and fits within the metal frame 10 and provides flat portions 16 adapted to be placed in facial abutment against the rear wall surfaces of the peripheral flange 12. The medial portion of the lens 15 provides a thickened body portion 17 which is adapted to project beyond the edge of the flange 12 a distance sufficient to be positioned beyond the flange 12 but inwardly of the bead 14.

A suitable heat-press is then applied to the thermoplastic composition comprising the lens 15, causing the thickened body portion to flow about the exposed edge 18 of the flange 12 so as to seal the lens 15 onto the flange 12. A suitable adhesive 19 may be applied about the inner edge of the lens 15 so as to seal it against the inner wall 20 of the peripheral edge 11.

From the foregoing, it is apparent that there is provided a permanent, transparent thermoplastic window for the cover which is both sealed against dust, moisture and airborne foreign materials and of durable construction.

Figure 3:
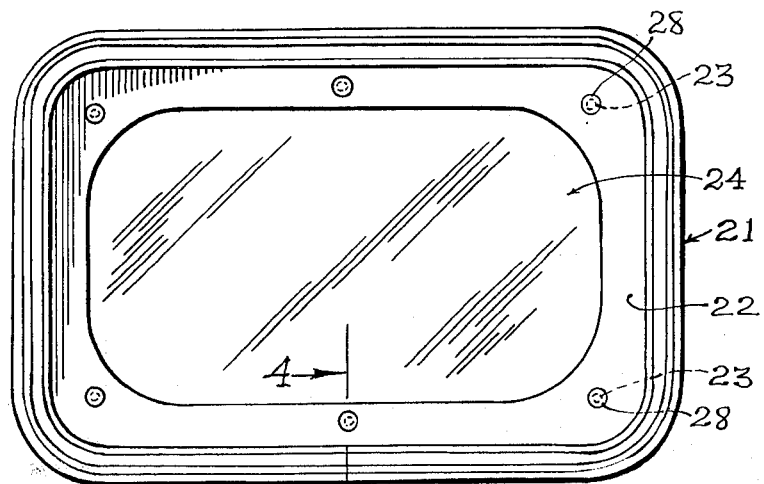
FIG. 3 is a plan view of a modified meter box window cover.

In FIG. 3 there is shown a modified form of meter box window cover wherein the metallic frame 21 provides an internal flange 22, which flange is formed to provide a series of apertures 23. A suitably shaped lens 24 is placed within the metal frame 21 and provides a thickened medial body portion 25 which is disposed within the edge of the flange 22. The lens 24 also provides a peripheral lip 26 which is adapted to extend behind the flange 22 and into abutment with the inner edge of the frame 21.

Figure 4:
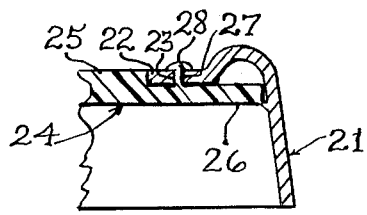
FIG. 4 is a fragmentary detailed sectional view taken on line 4—4 of FIG. 3.
Figure 5:
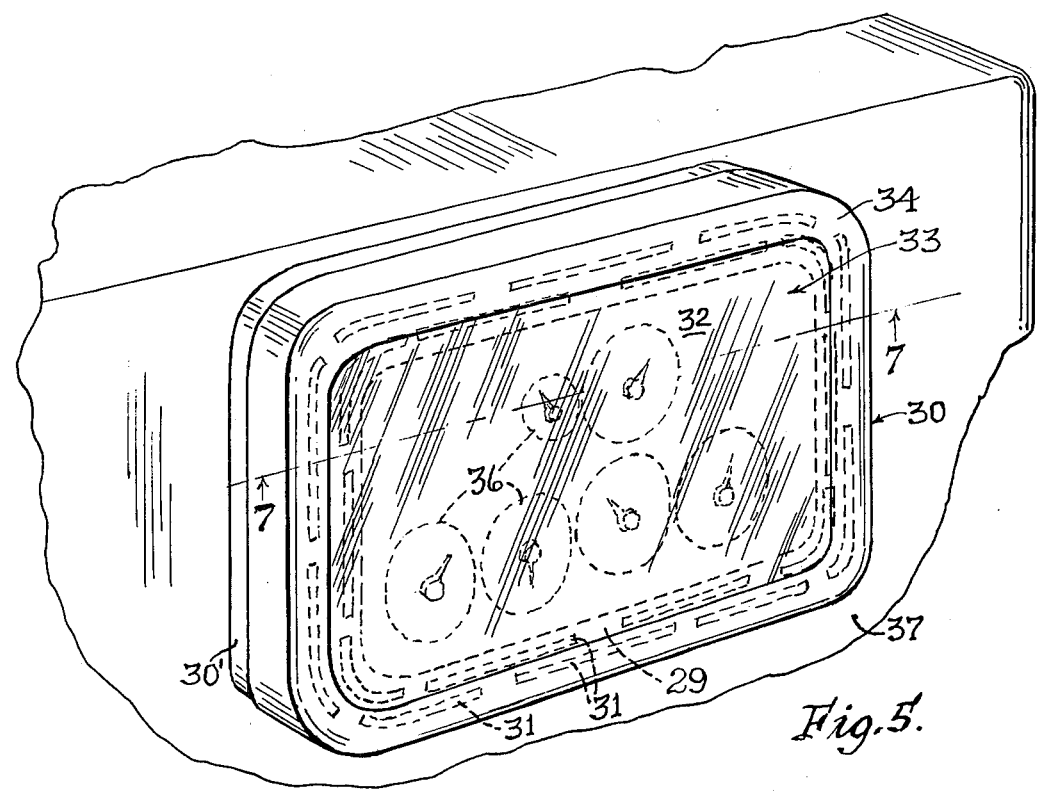
FIG. 5 is a fragmentary perspective view of a modified meter box window cover.

As best seen in FIG. 4, the lens 24 provides studs 27 which are adapted to be projected through the apertures 23 formed in the flange 22 of the frame 21. By a suitable heated tool the ends of the studs 27 may be swedged upon the flange 22 in the manner shown as at 28 in FIG. 4. By this modified form, the lens 24 is secured within the frame 21.

Figure 6:
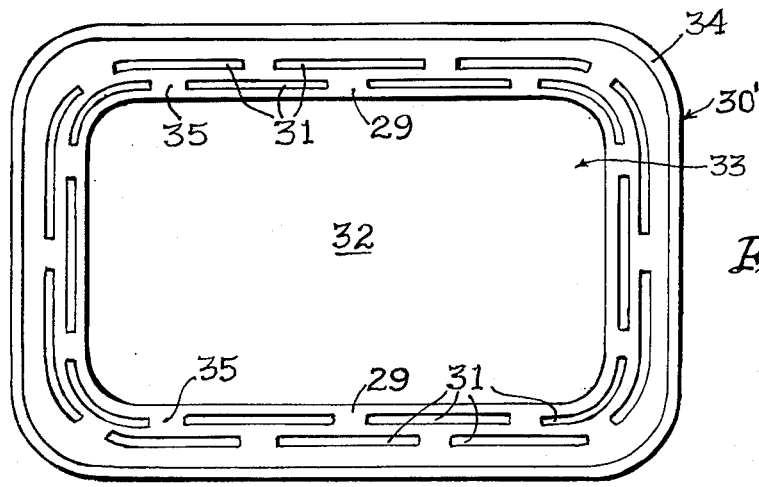
FIG. 6 is a front elevational view of the metal frame of the modified meter box window cover of FIG. 5.
Figure 8:
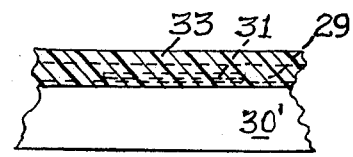
FIG. 8 is a fragmentary detailed sectional view showing in dotted lines one of the slots formed in the modified meter box window cover of FIG. 5.
Figure 7:
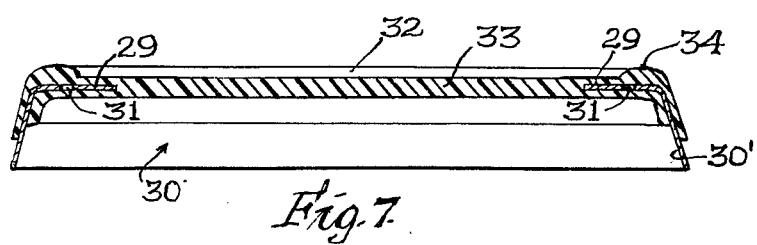
FIG. 7 is a detailed sectional view taken on line 7—7 of FIG. 5.

As shown in FIGS. 5 through 8, the internal flange 29 of the frame 30' of a modified form of meter box cover 30 has formed therein a plurality of elongated slots 31 which completely encircle the window area 32 and which may be formed in a plurality of rows, with the slots alternately disposed with respect to each other as shown in FIG. 6.

The frame 30 is then placed in a suitable mold into which is emitted a thermoplastic composition 33 which freely flows about the internal flange 29 and passes through the slots 31. The window area 32 of the cover 30 may be provided with a thickened beaded edge 34 to add strength and rigidity to the structure.

The formation of the elongated slots 31 adjacent the peripheral edge of the inner flange 29 leaves a series of thin metallic webs 35 about and around which the thermoplastic material is molded. During the normal curing stage of the composition, the composition has a tendency to shrink. To prevent rupture of the adhesion of the thermoplastic composition to the metal frame during the curing stage, these thin webs 35 of material will distort and conform to the shrinking curing thermoplastic without rupturing the adhesion therebetween.

After the complete curing of the material, the meter box window cover may be installed as a replacement unit on a meter box by having the peripheral edge welded onto the metal meter box, forming a complete sealed cover for the dials 36 of the meter box 37.

From the foregoing, it is apparent that there is provided a completely sealed meter box cover which may be readily attached to an existing metal meter box in a permanent and lasting manner.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A meter box window cover having
   a. a metallic frame providing a peripheral bead semicircular in cross section defining a substantially rectangularly shaped face and a peripheral edge extending laterally from said bead defining the cover,
   b. a flange extending inwardly and out of the normal plane of said bead defining a recessed window area within said frame, and
   c. a moldable thermoplastic transparent window of a size to fit beneath said flange and within said peripheral edge and providing a thickened medial portion within said recessed window area, with the edges of said medial portion overlapping said flange for securing said window within said frame.

2. A meter box window cover as defined by claim 1 in which said flange is provided with a plurality of slots extending about said recessed window area through which said moldable thermoplastic transparent window flows so as to cover both sides of said flange for securing said window within said window area and within said frame.

* * * * *